United States Patent [19]

Yeates

[11] 4,016,583
[45] Apr. 5, 1977

[54] CAMERA STEADYING DEVICE

[76] Inventor: Calvin B. Yeates, 21158 Bank Mill Road, Saratoga, Calif. 95070

[22] Filed: June 24, 1975

[21] Appl. No.: 589,662

[52] U.S. Cl. .............................. 354/293; 354/81; 248/181

[51] Int. Cl. .................................. G03b 17/56

[58] Field of Search ............ 354/81, 82, 293; 352/243; 248/181, 122

[56] References Cited

UNITED STATES PATENTS

| 718,445 | 1/1903 | Fliehmann | 248/181 |
|---|---|---|---|
| 608,850 | 8/1898 | Folmer | 248/181 |
| 686,872 | 11/1901 | Whetham | 248/181 |
| 687,183 | 11/1901 | Kolander | 248/181 |
| 687,347 | 11/1901 | Stapleton | 248/181 |
| 696,167 | 3/1902 | Forester | 248/181 |
| 2,332,504 | 10/1943 | Brenner | 248/181 |
| 3,176,602 | 4/1965 | Wilt | 354/293 |
| 3,356,325 | 12/1967 | Schnase | 354/293 |
| 3,908,945 | 9/1975 | Shapiro et al. | 248/181 |

Primary Examiner—L. T. Hix
Assistant Examiner—Alan Mathews
Attorney, Agent, or Firm—Owen, Wickersham & Erickson

[57] ABSTRACT

A camera steadying device for use with a tripod. The device comprises two members, one of them having a tripod-attachment receptacle and providing a cup, the other having a ball portion and a camera-attachment stud that fits into the camera's tripod-attachment receptacle. The ball portion fits into the cup but is not attached to it, so that the camera is never attached to the tripod, yet the camera can nearly instantaneously be given tripod support, the photographer holding the camera in place with one hand while he uses the other hand to take the picture. Free rotation between the cup and the ball enables support at any desired angle.

6 Claims, 7 Drawing Figures

CAMERA STEADYING DEVICE

BACKGROUND OF THE INVENTION

This invention relates to a camera steadying device.

The picture sharpness that can be obtained only when a camera is sturdily supported, as by a tripod, has long been considered inconsistent with the freedom of action characteristic of hand-held cameras. Such freedom of action has been considered incompatible with tripod support, for it takes time to attach the tripod to the camera when the two have been carried separately, and further time is lost and annoyance added by having to loosen and tighten levers, as is necessary on conventional tripod heads, and by that time the picture may be gone or the photographer's creative mood may be lost by the frustations involved; his companions on field trips may be impatiently urging him to leave or may have departed already. Therefore, many photographers have sacrificed picture sharpness to the convenience and near necessity of having a simple camera strap around their neck and holding the camera by hand. Others have chosen the more cumbersome course of keeping the camera attached to the tripod, with its awkwardness for carrying and the requirement of having to contend with the aggravating and time-consuming levers found on conventional tripod heads, which levers must be loosened before the photographer can properly frame his picture and must then be retightened before he takes his picture.

One object of the present invention is to combine the convenience of the hand-carried camera with the steadiness of tripod support. This invention enables the photographer to obtain the tripod support that he needs for picture sharpness while it also enables him to detach the camera immediately from the tripod. It also enables the photographer to obtain instantly any desired camera angle while getting tripod support.

SUMMARY OF THE INVENTION

The present invention comprises a two-part structure. One member is firmly attached to the tripod and is normally carried with it, having a receptacle to which the tripod's stud is attached. This tripod head provides a cup which may have practically any shape, although in many instances, a spherical segment is the preferred shape. The other member is firmly attached to the camera, having a stud like that on the tripod for attachment into the camera's receptacle that normally is used to receive the tripod. Depending from the stud is a ball portion which is related in size to the cup. No attachment is made between the two members while the camera is in service when tripod support is desired, the ball portion is slipped into the cup, rotated to any desired angle, and then held there by one hand.

The two members are, however, preferably constructed so as to be secured together when they are not in use and when they are detached from the tripod and camera, thereby making it easier to store or to pack or to carry in one's pocket. For this purpose, the stud at the end of the ball portion is threaded into the receptacle of the member having the cup, after the ball has been inverted and placed into the cup. This is much more convenient than having to insert the ball from the same direction as the tripod and results in a much more compact structure.

Other objects and advantages and structural features of the invention will become apparent from the following description of some preferred embodiments.

DESCRIPTION OF SOME PREFERRED EMBODIMENTS

Figure 1:
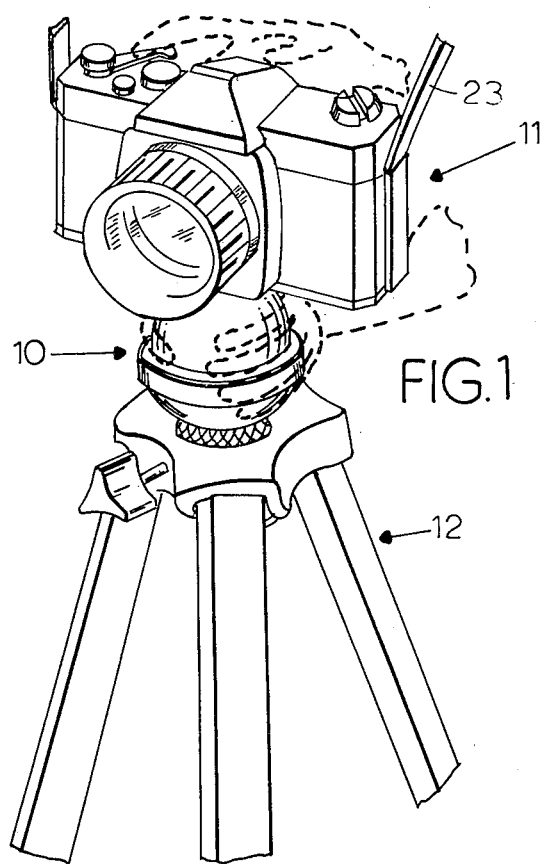
FIG. 1 is a view in perspective of a device embodying the principles of the present invention, shown in use in connection with a camera and a tripod. The device is shown held together by hand. The bottom portions of the tripod legs are broken off in order to conserve space.
Figure 2:
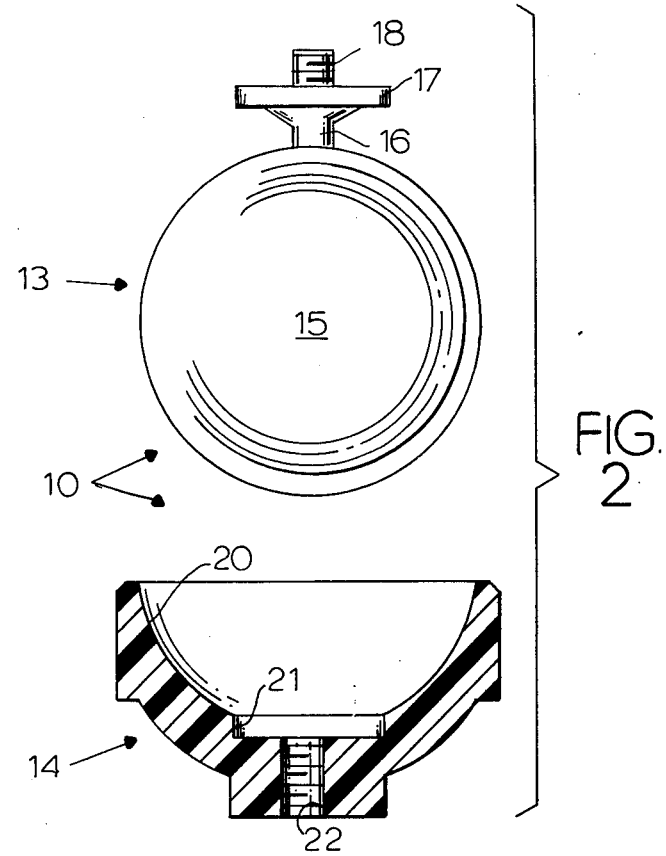
FIG. 2 is a view in side elevation of the device of FIG. 1, without the camera and tripod and with the lower portion shown in section and the two elements shown separated from each other.
Figure 4:
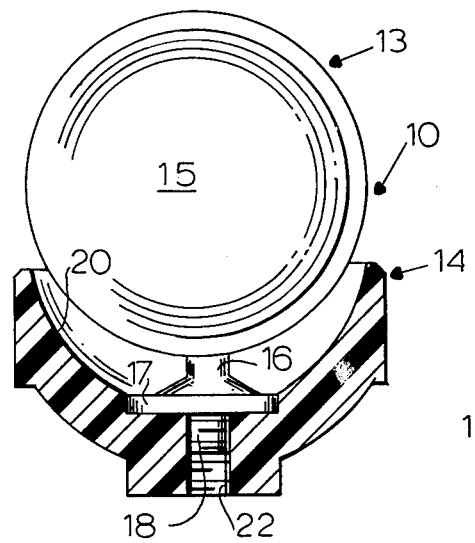
FIG. 4 is a view of the same two elements shown in their storage position, locked together.
Figure 3:
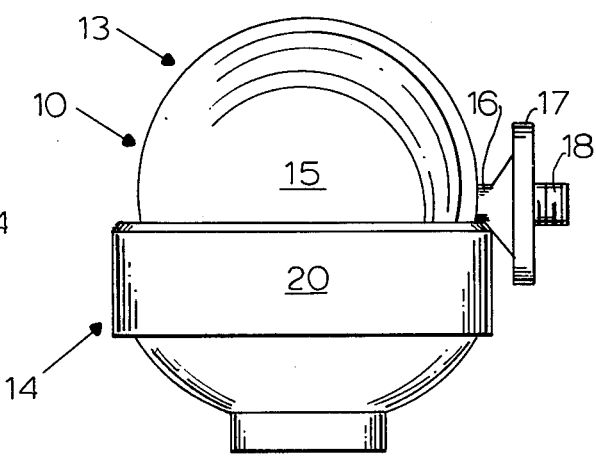
FIG. 3 is a view of the same two elements shown assembled and in position for a vertically oriented picture, though the camera and tripod are not shown in order to obtain more clarity as to the device itself.

FIG. 1 shows a device 10 embodying the principles of the invention in use with a camera 11 and a tripod 12, while FIGS. 2, 3, and 4 show the device 10 itself. As shown in FIG. 2, the device 10 comprises two separate elements: an upper element 13 and a lower element 14. The upper element 13 comprises a ball 15 and a projection 16 having a disk 17 and a threaded stud 18. The threaded stud 18 fits into a receptacle of the camera 11, almost all cameras having threaded receptacles of the same size to enable this.

The lower member 14 has a cup portion 20 which has a spherical segment surface exactly matching that of the ball 15, and the cup portion 20 is connected by a well 21 to a threaded through opening or receptacle 22, into which a stud of the camera tripod 12 is threaded, practically all kinds of tripod having the same kind of stud.

The photographer typically carries the camera 11 by means of a camera neck strap 23, with the upper member 13 attached to the camera 11, and he carries the tripod 12 (or someone else may carry it for him) with the lower member 14 attached to the tripod 12. When he wishes to take a picture with steady support, he simply sets up the tripod 12 and lowers the ball 15, which is carried attached to the camera 11, into the cup 20. He may set the camera 11 at any desired attitude by rotating the ball 15 relative to the cup 20 and thereby instantly obtaining any viewpoint whatever, including tilts up to more than the 90° tilt shown in FIG. 3, a 90° tilt being used where it is desired to obtain a vertical framing of the picture instead of a horizontal framing. Then while taking the picture he holds the members 13 and 14 together with one hand while operating the camera 11 with the other hand. Thus, he obtains the tripod support and the maintenance of the camera's desired attitude without relying on his hand for the actual support; a slight grip of his hand effects a momentary attachment, holding the two members 13 and 14 together, and it can do so very effectively since all of the weight is being borne by the tripod 12 and not by the hand.

When the device is not to be used for a substantial length of time, the upper member 13 may be detached from the camera 11, and the lower member 14 may be detached from the tripod 12. The upper member 13 may then be inverted with respect to FIGS. 1 and 2 and inserted into the lower member 14, with the ball 15 inside the cup 20 and the disc 17 extending down into the well 21; then the stud 18 can be threaded into the upper portion of the threaded opening 22. (See FIG. 4) This compact arrangement enables storage, packing, and carrying in one's pocket; alternatively, the coupled elements may be carried attached to the tripod 12, simply by attaching the tripod 12 to the lower portion of the threads 22.

Figure 5:
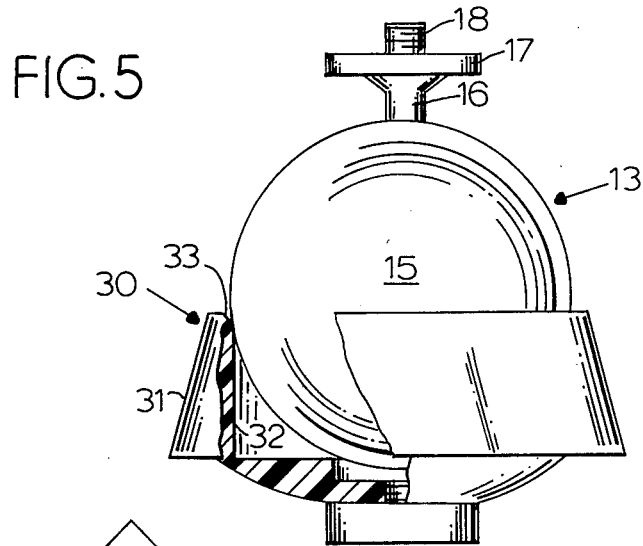
FIG. 5 is a view in side elevation of a modified form of the invention with a portion of the lower member broken away and shown in section.

The invention may be embodied in various forms. For example, FIG. 5 shows a device 30 having substantially all of the operative functions of the device 10 form of FIGS. 2 through 4, and, in fact, the upper member 13 is identical, but in the device 30, there is a lower member 31 having a cup portion 32 that is not provided with a spherical segment surface but instead has a generally cylindrical shape. Here the ball 15 is slightly oversize with respect to the portion 32 and rests on a very short beveled rim 33. The ball 15 in this instance touches the cup 32 only at this beveled rim 33. Although the rim 33 could have a sharp edge, it is preferable for it to have some slight bevel or curvature so that it will be less likely to damage the ball 15. The operation of the device 30 of FIG. 5 is in all respects the same as that of the device 10 of FIGS. 2 to 4 except that there is no support of the ball 15 by a spherical portion but only by the narrow rim 33.

Figure 6:
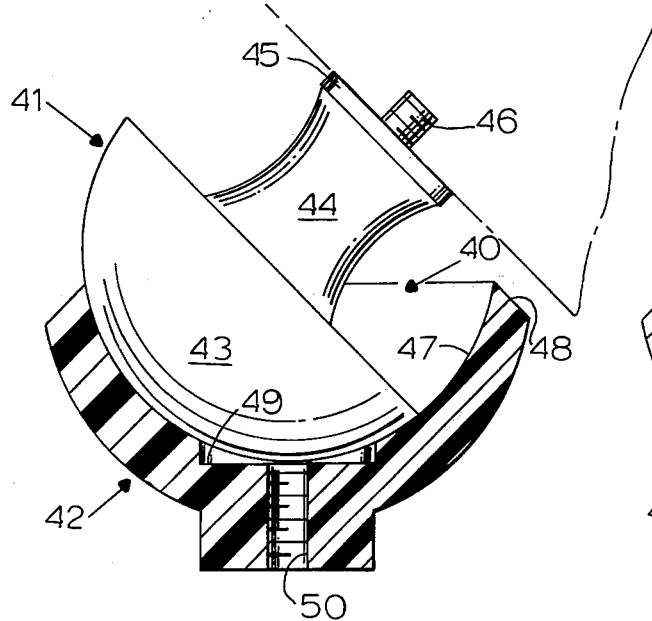
FIG. 6 is a view in elevation and with the lower member in section of another modified form of the invention, for use with square-format and larger cameras, shown tilted 45°.
Figure 7:
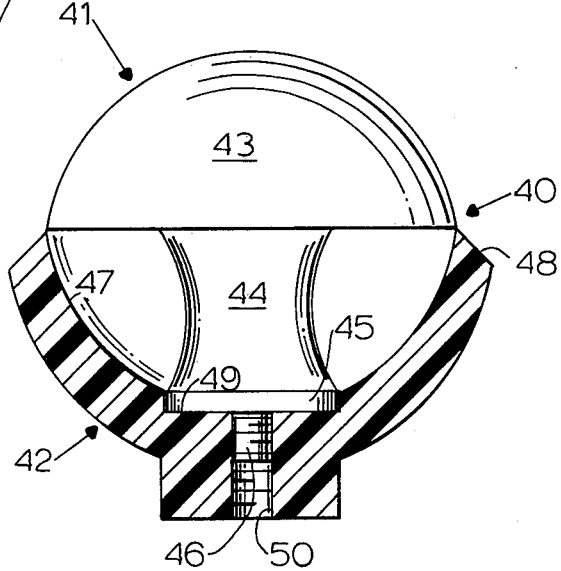
FIG. 7 is a view similar to FIG. 4 of this modified form of the invention.

Another embodiment of the invention is shown in FIGS. 6 and 7. Here is a device 40 suitable for use with a squareformat camera, such as 6 × 6 centimeter camera. The device 40 is also suitable for use with cameras of larger or smaller formats of various dimensions. In this instance, there is again an upper member 41 and a lower member 42, and the upper member 41 has a hemispherical ball portion 43 to the upper end of which is attached a stem 44, a shelf-like disk 45, and a stud 46. The lower member 42 has a cup 47 with a spherical segment surface, and it has a bevel 48 along its upper edge and a well 49 leading to a threaded receptacle 50 to receive the threaded members. Use is the same, except that for a square-format camera, 45° is sufficient tilt, so that a more complete ball is not needed. The bevel 48 prevents interference with the camera 11 itself.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A camera steadying device for use with a tripod or tripod head having a projecting threaded stud and a camera with an interiorly-threaded receptacle for said stud, including in combination:

a first member for ready and easy attachment to and detachment from a said tripod providing a cup with a stud-receiving interiorly threaded receptacle extending through a bottom portion thereof, a second member for ready and easy attachment to and detachment from a said camera having a camera-attachment threaded projection for fitting in the camera's said interiorly-threaded receptacle and a ball portion depending from said projection for fitting rotatably in said cup for support thereby without attachment thereto, said ball portion being accessible to the hands of the user after being fitted in said cup with the camera on it, said second member being freely rotatable in said first member and instantly removable therefrom and being held in place during use by one hand of the user at any desired position, with some portion of the hand engaging said first member and other portions engaging said second member, whereby the camera can be supported by the tripod without attachment thereto and hence can instantly be separated therefrom.

2. The device of claim 1 wherein said first and second members are so shaped and sized relative to each other that when said first member is not attached to a tripod and second member is not attached to said camera, said second member can be inverted and inserted into the cup of said first member and the projection of said second member threaded into the receptacle of said first member.

3. The device of claim 1 wherein the inner surface of said cup is a spherical shape to mate with said ball.

4. The device of claim 3 wherein said receptacle is joined to said inner surface by a well capable of enabling said projection to be threaded into said receptacle when said first member is inverted and inserted into said cup.

5. A camera steadying device for use with a tripod or tripod head having a projecting threaded stud and a camera with an interiorly-threaded receptacle for said stud, including in combination:

a first member for ready and easy attachment to and detachment from a said tripod, providing a stud-receiving interiorly-threaded receptacle extending through a bottom portion thereof, and a second member for ready and easy attachment to and detachment from a said camera, having a camera-attachment threaded projection for fitting in the camera's said interiorly-threaded receptacle, one said member providing a cup, the other said member providing a ball portion for fitting rotatably in said cup for support thereby without attachment thereto, both said ball portion and said cup being directly accessible to the user's hands when put together and with the camera and tripod installed on them, being freely rotatable therein and instantly removable therefrom and being held in place by one hand of the user at any desired position, with some portions of the hand engaging said first member and other portions engaging said second member, whereby the camera can be supported by the tripod without attachment thereto and hence can instantly be separated therefrom.

6. The device of claim 5 wherein said first and second members are so shaped and sized relative to each other that when said first member is not attached to a tripod and second member is not attached to said camera, said ball portion can be inserted into said cup and the projection of said second member threaded into the receptacle of said first member.

* * * * *